United States Patent [19]

Proulx

[11] 4,181,428
[45] Jan. 1, 1980

[54] SPECIAL EFFECTS COMPOUND AND SLIDE HOLDER THEREFOR

[75] Inventor: J. J. Andre Proulx, Ottawa, Canada

[73] Assignee: Optical Art Camera Corporation, Ottawa, Canada

[21] Appl. No.: 929,711

[22] Filed: Jul. 31, 1978

[51] Int. Cl.² .................................................. G03B 27/62
[52] U.S. Cl. ..................................................... 355/75
[58] Field of Search ...................... 355/75, 76; 353/95

[56] References Cited

U.S. PATENT DOCUMENTS

| | | | |
|---|---|---|---|
| 2,113,580 | 3/1938 | Draeger | 352/80 X |
| 2,179,550 | 11/1939 | Frappier et al. | 74/243 F |
| 2,199,305 | 4/1940 | Dewey | 355/75 |
| 2,251,184 | 7/1941 | Bohannon | 355/75 |
| 2,418,226 | 4/1947 | Haff | 355/75 |
| 2,486,040 | 10/1949 | Laube et al. | 156/502 X |
| 2,589,680 | 3/1952 | Denney, Sr. | 355/75 |
| 2,664,781 | 1/1954 | Waller | 354/296 X |
| 2,959,096 | 11/1960 | Bobeck et al. | 355/75 |
| 2,971,435 | 2/1961 | Singleterry | 353/95 |
| 2,994,362 | 8/1961 | Hall | 156/505 |
| 2,995,979 | 8/1961 | Gordon et al. | 355/75 |
| 3,159,077 | 12/1964 | Hoag et al. | 353/95 |
| 3,194,114 | 7/1965 | Weinberg | 355/75 |
| 3,203,311 | 8/1965 | Woodcock et al. | 355/75 |
| 3,252,370 | 5/1966 | Luther | 353/95 X |
| 3,292,444 | 12/1966 | Bentley | 353/95 X |
| 3,428,511 | 2/1969 | Catozzo | 156/505 |
| 3,488,120 | 1/1970 | Nagel | 353/95 X |
| 3,546,046 | 12/1970 | MacQueston | 156/202 X |
| 3,547,532 | 12/1970 | Grant | 355/75 X |
| 3,604,328 | 9/1971 | Nakagawa | 355/75 |
| 3,775,003 | 11/1973 | Smith | 353/95 X |
| 3,923,390 | 12/1975 | Sasko | 353/95 |
| 3,974,582 | 8/1976 | Jantzen, Jr. | 355/75 X |
| 4,049,341 | 9/1977 | Toriumi et al. | 353/95 |

Primary Examiner—L. T. Hix
Assistant Examiner—W. J. Brady

Attorney, Agent, or Firm—Roylance, Abrams, Berdo & Farley

[57] ABSTRACT

The invention relates to a compound for holding photographic slides or negatives for reproduction thereof or for the production of special effects. The compound may be used with most reproduction or special effects cameras now available and is provided with movable table portions which are subject to micrometer adjustment for accurate positioning of the slide relative to the camera. In addition the table portions are rotatable relative to a base portion which is actually mounted adjacent the camera light source. Of particular interest is the device utilized to hold a slide in the compound. It includes a platen base which may be removably received in the uppermost compound table portion. The platen base is provided with at least three registration pins for mating with corresponding ones of the usual sprocket holes or perforations in a slide. Each pin is rectangular in cross-section with the major dimension of each being equal to one of the dimensions of length or width of a slide perforation. Preferably one pin has its major dimension equal to the length of a perforation while the other two pins have their major dimension equal to the width of a perforation. The minor dimension of each pin is of course less than the corresponding dimension of a slide perforation. By using these pins the slide is accurately held on the platen base and there is little chance of damaging the slide. Also positionable on the platen base is a release plate having openings through which the registration pins may pass. A platen is provided as well, the slide being sandwiched between the release plate and platen before being positioned on the platen base. Thus the slide is accurately held between the release plate and the platen on the platen base and the entire assembly may be readily assembled to or removed from the compound as required without damage to the slide.

16 Claims, 4 Drawing Figures

SPECIAL EFFECTS COMPOUND AND SLIDE HOLDER THEREFOR

The present invention relates to a special effects compound for use in photographic reproduction techniques and to a device for accurately holding a slide or negative in the compound.

BACKGROUND OF THE INVENTION

In photographic reproduction of slides or negatives it is necessary to hold the slide near the camera and its light source in an accurate location. There are many slide holders available usable with the various makes of cameras in use. it is also normal to use such cameras to achieve special effects such as drop-shadows, posterizations, split-screens, zoom effects, and spirals with slides or negatives.

In the past, slide holders have used the usual sprocket-holes or perforations present along the edges of a slide for accurate positioning, the perforations being fitted over registration pins in the slide holder. In the past such pins have been approximately the same size as the slide perforations and, while the slide is held immovably thereon, this system may lead to damage of the perforations when the slide is removed. Usually such holders, have utilized perforations 2, 4 and 7 along the edge of a 35 mm slide, normally provided with eight such perforations.

In special effect situations where a special compound is used to hold the slide and to achieve the special effects therewith it has often been necessary to remove the entire compound from its mount in order to change or reorient a slide. This can of course lead to inaccuracies in the repositioning of the slide relative to the camera.

SUMMARY OF THE INVENTION

The present invention overcomes the problems of the prior art by providing a special effects compound that may be used with any reproduction camera available and that has a device for holding a slide or negative which can be readily removed from the compound to change the slide.

The compound of the present invention is provided with a base portion for mounting on the camera light source and a plurality of table portions which can rotate relative to the base portion and which can be adjusted longitudinally and transversely relative to each other for positioning a slide relative to the camera. A device for holding the slide in the uppermost table portion is provided, there being means to accurately position the device in that table position.

The device for holding the slide is an assembly of three main components, a platen base, a release plate and a platen. The slide is positioned between the release plate, which rests on the platen base, and the platen, which rests on the slide and release plate. The platen base is provided with at least three registration pins which will mate with specific perforations in the slide or negative. Each registration pin is generally rectangular in cross-section. One of the pins has one dimension of length or width or equal to the corresponding dimension of a slide perforation while the other pins have their other dimension of length or width equal to the corresponding dimension of a slide perforation. The other dimensions, non-specified, of the pins are less than the corresponding dimensions of a slide perforation. By utilizing such registration pins the slide is held against longitudinal or transverse movement and since there is less engagement between the pins and the perforations than in the past there is less chance of damage to the slide when it is removed from the pins.

Broadly speaking, therefore, the present invention may be defined as providing in a device for holding a photographic slide for use in photographic reproduction equipment, the slide having a plurality of elongated rectangular perforations of uniform length and width along at least one edge thereof, the improvement comprising a platen base having a generally rectangular light transmission opening therethrough, at least three spaced projecting rectangular pins located adjacent one edge of the opening, each pin having a major dimension and a minor dimension, one of the pins having its major dimension equal to one dimension of length or width of a slide perforation, and each of the other pins having its major dimension equal to the other dimension of length or width of a slide perforation; a release plate having at least three spaced openings for registry with corresponding ones of the pins; and a platen having means for accurate positioning thereof on the platen base; whereby a slide may be sandwiched between the release plate and the platen and then positioned on the platen base with the pins projecting through the openings of the release plate and corresponding perforations in the slide, each of the platen and release plate having a light transmission opening alignable with the light transmission opening of the platen base.

Also the present invention encompasses a special effects compound for use in photographic reproduction equipment comprising a compound table adapted for reception in the equipment, means for adjustably positioning the compound table relative to the equipment, a generally rectangular light transmission opening in the compound, and a device for accurately locating a photographic slide relative to the opening, the slide having a plurality of elongated rectangular perforations of uniform length and width along at least one side edge thereof, the device including a platen base having a light transmission opening therein, means for accurately positioning the platen base on the compound table so that the light transmission openings are in registry with each other, and three spaced rectangular pins projecting outwardly from the base adjacent the light transmission opening thereof, the end pins having a width equal to the width of a slide perforation and the intermediate pin having a length equal to the length of a slide perforation; the length of each end pin and the width of the intermediate pin being less than the corresponding dimension of a slide perforation; a release plate having three spaced openings for registry with corresponding ones of the pins, each spaced opening having a length and a width greater than that of each pin; and a platen having means for accurate positioning thereof on the platen base; whereby a slide may be sandwiched between the release plate and the platen and then positioned on the platen base with the pins projecting through the openings of the release plate and corresponding perforations in the slide, and the assembly of the base, release plate, slide, and platen may be accurately positioned in the compound table, each of the release plate and platen having a light transmission opening alignable with the light transmission openings of the platen base and the compound table.

DESCRIPTION OF THE PREFERRED EMBODIMENT

Figure 1:
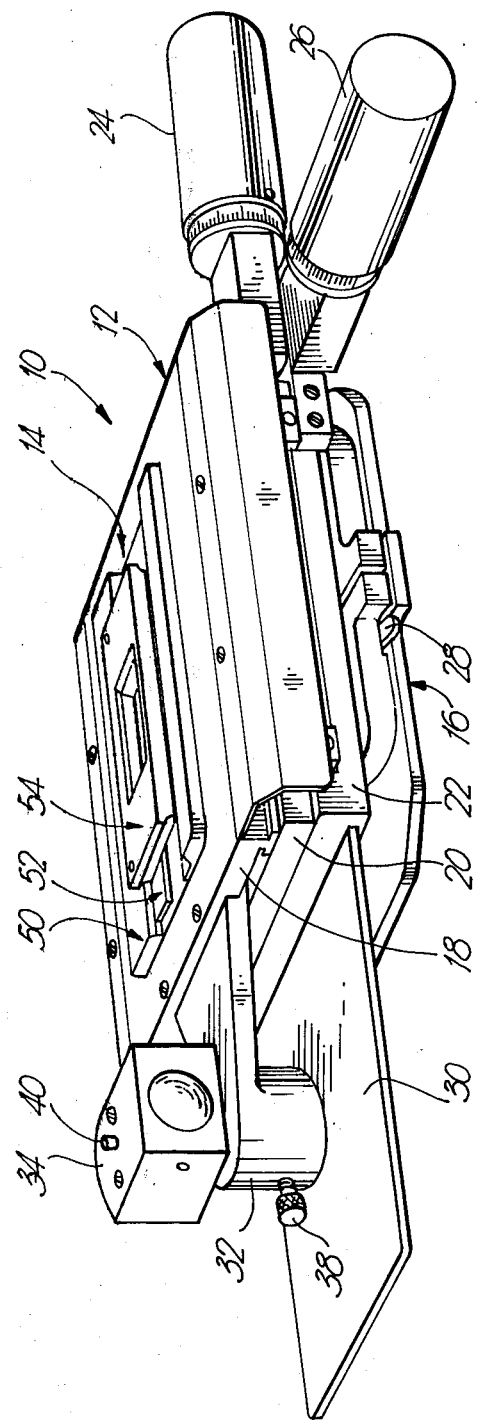
FIG. 1 illustrates the assembled special effects compound of the present invention.

The special effects compound of the present invention is denoted by reference number 10 and is shown fully assembled in FIG. 1. As such it may be utilized with any professional slide production camera-and-stand combination available at the present time. As illustrated the compound is intended for 35 mm slides, but with appropriately sized components it can handle anything from 16 mm slides, or tansparencies up to 4"×5" negatives just as easily.

The special effects compound 10, as indicated above is adapted for utilization with any professional camera available today. To that end the compound includes a compound table 12 which is mounted to the camera light source and a device 14 for holding the slide while it is being reproduced or otherwise utilized. The compound table itself is constructed from a plurality of components, namely a base portion 16 which is mounted with the slight source, and first, second and third table portions 18, 20 and 22. While not shown in any detail, as the construction thereof is conventional, the three table portions are provided with means for adjustably positioning themselves, and in effect the compound table and hence the slide, relative to the camera. In particular, a micrometer adjustment, actuated by dial member 24, is provided between the first and second table portions 18 and 20 whereby the first table portion may be moved transversely of the second table portion in ways provided in the second table portion. Similarly, a micrometer adjustment, actuated by dial member 26, is provided between the second and third table portions 20 and 22 whereby the first and second portions may be moved together longitudinally of the third table portion in ways provided in the third table portion. Finally, the third table portion is rotatably mounted to the base portion whereby the three table portions may be rotated as a unit relative to the base portion. The three table portions may be locked angularly relative to the base portion through cooperating ratchet means on the third table portion engageable by a pawl controlled by release pin 28.

In some instances, the special effects compound of the present invention may be used in situations where it is necessary to accurately position the slide relative to a grid, as for example when a plurality of slides are to be reproduced onto a master slide. For accurate positioning, a pantograph plate 30 is provided projecting outwardly from one side edge of the third table portion 22. A grid of predetermined size may be drawn on paper and fixed to the plate 30. A pantograph arm 32 projects outwardly from one side edge of the first table portion so as to be positioned above the pantograph plate. A prismatic sight glass 34 is positionable in an opening 36 in the pantograph arm 32 and locked therein by set screw 38. The sight glass is provided with cross-hairs that correspond to the center of area of the slide being photographed and is provided with illumination means such as a battery powered light bulb. The bulb may be turned on by pressing button 40 to illuminate the cross-hairs and then the micrometer adjustments may be made by rotating dial members 24 and 26 until the cross-hairs are properly positioned relative to the cross-points of the grid held on the plate 30. Since the cross-hairs of the sight glass represent the center of area of the slide being photographed it is possible, using the pantograph grid system, to accurately position one slide relative to another on the master sheet.

As an illustration of the accuracy available with the described adjustment mechanism, in one embodiment of the invention, one revolution of a dial member 24 or 26 will move the respective table portion(s) a distance of 1 mm. Each dial member is calibrated in gradations of 0.05 mm. Maximum movement from the center is 33 mm in each direction controlled by dial member 26 and 42 mm in each direction controlled by dial member 24.

Figure 2:
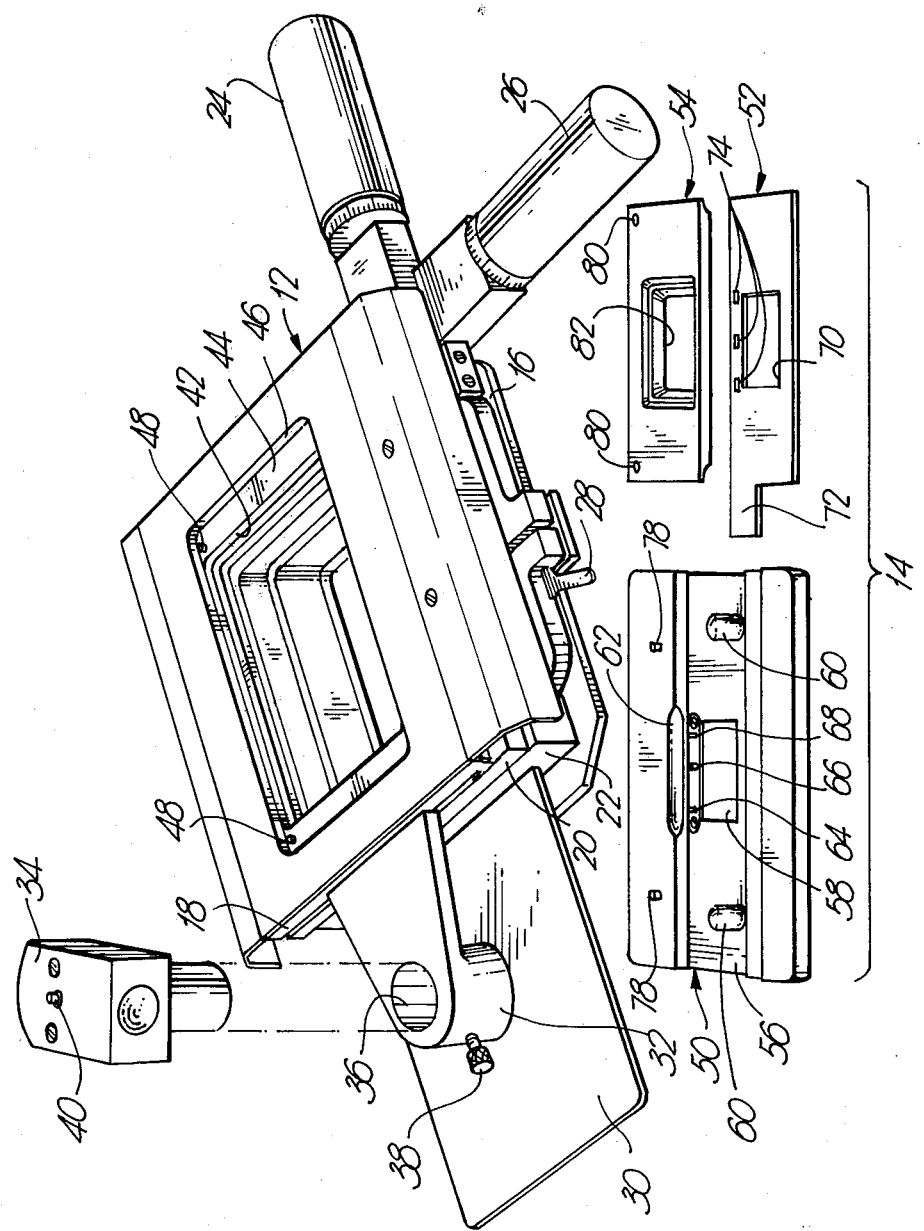
FIG. 2 illustrates the various components of the special effects compound of the present invention, including the device for accurately holding a slide, in an unassembled state.

As is clearly shown in FIG. 2, each of the three table portions and the base portion of the compound table is provided with a generally rectangular light transmission opening therethrough. In view of the adjustability of the various table portions relative to the base portion the smallest opening will be in the base portion with the openings in the third, second and first table portions being progressively larger. The opening 42 in the first table portion 18 is provided with a shoulder 44 which defines a recess 46 therein. As seen in FIG. 2 the shoulder 44 is wider adjacent the ends of opening 42 than adjacent the sides thereof. Adjacent each of two corners of the recess 46 is provided a registration pin 48 projecting upwardly from the shoulder 44. The purpose of the registration pins will become readily apparent from the following description.

A special effects compound such as that described herein will not function properly unless the slide to be reproduced is itself held positively and accurately. Also, the effectiveness of a compound that will accurately and readily adjust the position of a slide relative to the camera is greatly reduced if the compound must be removed from the camera each time a new slide is to replace a previously used slide. With the present invention the sub-combination of the device 14 used to hold the slide for use in the compound is especially effective in reducing the time required to change slides and it aids greatly in reducing slide damage.

As shown in FIG. 2 the device 14 comprises three main parts, a platen base 50, a release plate 52 and a platen 54. Each of these components will be described in some detail.

The platen base 50 is generally rectangular in shape and is sized so as to fit smoothly into recess 46 of the compound's first table portion and to rest on shoulder 44. While not shown in FIG. 2, platen base 50 is provided with a pair of registration holes in the underside thereof for mating engagement with registration pins 48 in recess 46. The engagement of pins 46 with the corresponding holes in the platen base will prevent movement of the platen base relative to the first table portion.

The upper side of the platen base 50 has a generally rectangular slot 56 milled therein, the slot being wider than the width of a slide. A light transmission opening 58, slightly smaller than the slide is provided in the slot as is a pair of depressions 60. A depression 62 is provided in one edge of the slot adjacent the opening 58. Also provided adjacent one side of the opening are three registration pins 64, 66 and 68 which are used to accurately position a slide in the device 14. The pins 14 are expecially sized to ensure that there will be no movement of a slide relative to the platen base while avoiding any damage to the slide.

As is well known, roll film, whether for transparencies or negatives, is provided with uniformly sized and spaced perforations along each side thereof. Thus, each slide, or negative, being of a uniform size, will have a fixed number of those perforations along each side. For a 35 mm slide there are eight such perforations along each side and each perforation has the same length and width.

Figure 3:
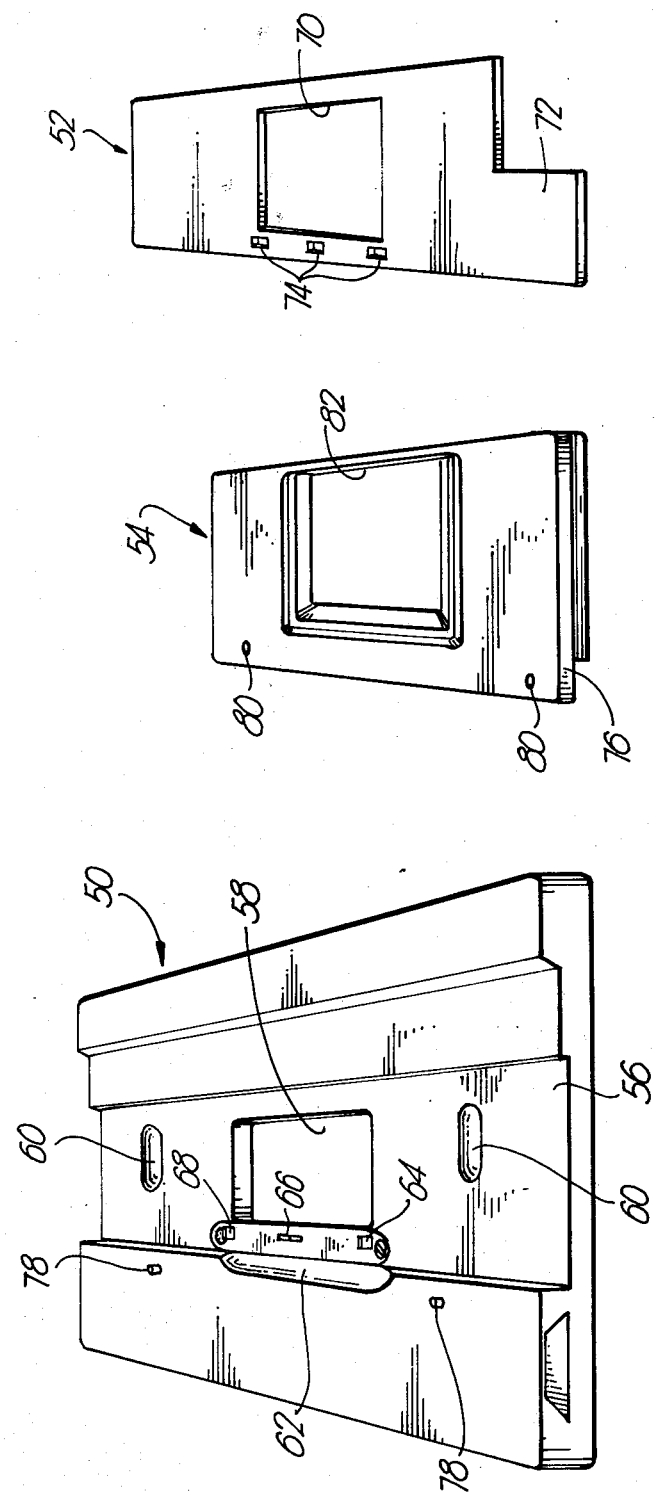
FIG. 3 is a side perspective view of the platen base, release plate and platen of the device shown in FIG. 2.
Figure 4:
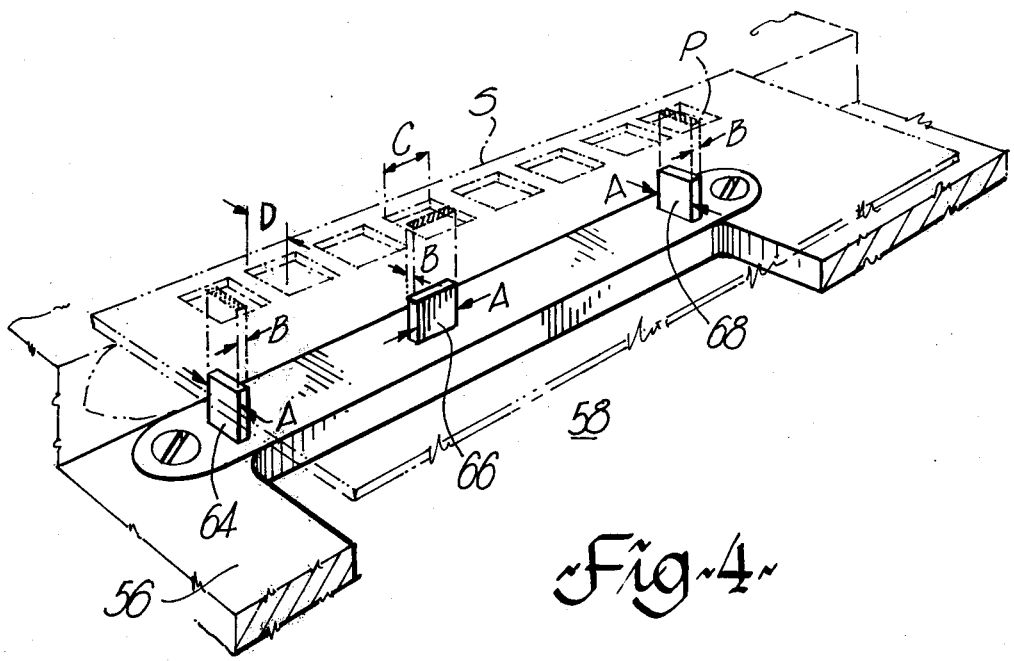
FIG. 4 shows an enlarged partial perspective view of the registration pins per se in conjunction with a slide as shown in phantom outline.

In the present invention, contrary to known practice wherein registration pins equal to the full size of a perforation have been used, pins of different sizes are used to achieve equal accuracy and less slide damage. Thus one of the registration pins, all of which are rectangular in cross-section, has its major dimension equal to one dimension of length or width of a perforation, and each of the other pins has its major dimension equal to the other dimension of length or width of a perforation. The minor dimension for each of the pins is less than the corresponding dimension of a slide perforation. In the embodiment as illustrated in FIGS. 2, 3 and 4 wherein a slide "S" having aligned equally sized and spaced perforations "P" is shown in phantom outline, pin 66 has its major dimension "A" equal to the length "C" of a slide perforation "P" and its major dimension "B" less than the width "D" of a perforation whereas each of pins 64 and 68 has its major dimension "A" equal to the width "D" of the slide perforation and its minor dimension "B" less than the length "C" of a slide perforation. Pin 66 will prevent lengthwise movement of the slide "S" relative to the opening 58 and pins 64 and 68 will prevent transverse movement. Also it has been found more desirable to locate the pins so that they correspond to perforations number 1, 4 and 8 rather than 2, 4 and 7 as used in the past. The different spacing enhances the control over slide positioning.

The release plate 52 is generally rectangular in cross-section and is provided with a rectangular light transmission opening 70 slightly larger than opening 58 in platen base 50. At one end a projection 72 coplanar with plate 52 is provided. Adjacent one edge of the opening 70 is a plurality of spaced openings 74, each of which is sized to receive a corresponding registration pin 64, 66 or 68 therein with clearance therearound. Since the release plate is sized for reception in slot 56 of platen base 50 with allowance for some transverse and longitudinal movement therein, it is clear that the clearance provided around pins 64, 66 and 68 by openings 74 will limit such movement.

The final component of the device 14 is the platen 54 which is generally rectangular and is of a length similar to that of the main portion of release plate 52. Platen 54 also has a cantilever portion 76 adjacent one edge thereof, which portion is intended to overlie the upper surface of platen base 50. Base 50 is provided with registration pins 78 and cantilever portion 76 is provided with registration holes 80 whereby the platen may be accurately located in the platen base. The platen has a rectangular light transmission opening 82 slightly larger than that in release plate 52.

In use, a slide is positioned between the release plate 52 and the platen 54 whereby the perforations 1, 4 and 8 of the slide overly the corresponding openings 74 in release plate 52 and the body of the slide overlies opening 70. The platen 54 is roughly positioned to be congruent to release plate 52 whereby the periphery of opening 82 lies on the slide and holds it against the release plate.

The sandwich of release plate 52, slide, and platen 54 is then placed on platen base 50 with the release plate being positioned in the slot 56 and the openings 74 located over the respective registration pins 64, 66 and 68. The sandwich is located on the pins and permitted to lie in the slot 56 with the pins 64, 66, 68 positively locating the slide thereon. The platen is fixed in position via pins 78 and holes 80. In order to ensure registration between pins 64, 66, 68 and the slide the height of the pins must be greater than the combined thickness of the release plate and slide. This necessitates the provision of relief portions in the form of counterbores (not shown) in the underside of platen 54. These counterbores are larger than the pins 64, 66, 68 and permit the weight of the platen to press the film to the bottom of the pins.

The platen is sufficiently heavy and is accurately machined so that no errant light will pass to the slide except through opening 82. Similarly the release plate 52, platen base 50 and the slot 56 are accurately machined so that no errant light will pass through the slide.

With the slide sandwich located in the platen base, the entire assembly may be positioned in the special effects compound, in recess 44. When a different slide is to be used it is only necessary to remove the device 14 and to then lift out release plate 52 which takes with it the slide and the platen. The ease of removing the release plate is enhanced by the depressions 60 and 62 which permit a better grip on the release plate. This also reduces the chance of damage to the slides.

The projection 72 on the release plate acts as a control arm for the limited longitudinal and transverse movement of the plate as determined by openings 74. Such movement can properly frame the slide by compensating for acceptable tolerance in 35 mm still photography.

It is understood that the above description provides a description of the best method known of putting the present invention into effect but that certain changes thereto may occur to a person skilled in the art. Hence the protection to be afforded the present invention is to be determined by the scope of the appended claims.

The embodiments of the invention in which an exclusive property or privilege is claimed are defined as follows:

1. A device for use in photographic reproduction equipment for holding a photographic slide, which slide has a plurality of elongated perforations of uniform length and width dimensions, comprising:
   a platen base having a generally rectangular light transmission opening extending therethrough;
   at least three spaced projecting rectangular pins located adjacent one edge of said opening, each pin having a major dimension and a minor dimension, one of said pins having its major dimension equal one of the length or width dimension of a slide perforation and having its minor dimension less than the other of the length or width dimension of a slide perforation, each of the others of said pins having its major dimension equal to the other of the length or width dimension of a slide perforation and having its minor dimension less than the one of the length or width dimension of a side perforation;

a release plate having at least three spaced openings for registry with corresponding ones of said pins and having a light transmission opening alignable with said platen base light transmission opening; and a platen having means for accurate positioning thereof on said platen base and having a light transmission opening alignable with said light transmission openings of said platen base and said release plate;

whereby a slide may be sandwiched between said release plate and said platen and then positioned on said platen base with said pins projecting through said release plate openings and corresponding perforations in a slide.

2. A device according to claim 1, wherein said platen base has a generally rectangular slot therein, said pins and said light transmission opening thereof being located in said slot, said release plate being receivable in said slot.

3. A device according to claim 2, wherein each of said spaced openings of said release plate has length and width dimensions greater than the major and minor dimensions of the rectangular pin with which it is registrable, thereby permitting sliding movement of said release plate relative to said pins.

4. A device according to claim 3, wherein said platen has a first portion receivable in said slot and a second potion carrying said means for accurate positioning thereof on said platen base.

5. A device according to claim 4, wherein said second portion includes a portion cantilevered from said first portion to overlie said platen base when said first portion is received in said slot, said platen base has a pair of registration pins projecting therefrom, and said means comprises a pair of spaced alignment holes in said second portion, each registrable with a corresponding one of said pair of registration pins projecting from said platen base.

6. A device according to claim 5, wherein said platen base is provided with means for accurately positioning said platen base in photographic reproduction equipment.

7. A device according to claim 1, wherein said pins are located adjacent only one edge of said light transmission opening in said platen base.

8. A special effects compound for use in photographic reproduction equipment for holding a slide, which slide has a plurality of elongated perforations of uniform length and width dimensions, comprising:

a compound table adapted for reception in photographic reproduction equipment, having means for adjustably positioning said compound table relative to photographic reproduction equipment and having a generally rectangular light transmission opening therein; and a device for accurately locating a photographic slide relative to said compound table opening including a platen base having a light transmission opening therein and means for accurately positioning said platen base on said compound table to register said light transmission openings relative to each other;

three spaced rectangular pins projecting outwardly from said platen base adjacent its light transmission opening and arranged to provide two end pins and an intermediate pin; each pin having a major dimension and a minor dimension, each of said end pins having its major dimension equal to the width dimension of a slide perforation and its minor dimension less than the length dimension of a slide perforation, said intermediate pin having its major dimension equal to the length dimension of a slide perforation and its minor dimension less than the width dimension of a slide perforation;

a release plate having three spaced openings for registry with corresponding ones of said pins and having a light transmission opening alignable with said platen base light transmission opening, each of said three spaced openings having length and width dimensions greater than the major and minor dimensions of the rectangular pin with which it is registrable; and a platen having means for accurate positioning thereof on said platen base and having a light transmission opening alignable with said light transmission openings of said platen base and said release plate;

whereby a slide may be sandwiched between said release plate and said platen and then positioned on said platen base with said pins projecting through said release plate openings and corresponding slide perforations, and said platen base, said release plate, slide and said platen may be accurately positioned in said compound table.

9. A special effects compound according to claim 8, wherein said pins are located adjacent only one edge of said light transmission opening in said platen base.

10. A special effects compound according to claim 8, wherein said platen base has a generally rectangular slot therein, said pins and said light transmission opening thereof being located in said slot, said release plate being receivable in said slot.

11. A special effects compound according to claim 10, wherein said platen has a first portion receivable in said slot and a second portion carrying said means for accurate positioning thereof on said platen base.

12. A special effects compound according to claim 11, wherein said second portion includes a portion cantilevered from said first portion to overlie said platen base when said first portion is received in said slot, said platen base has a pair of registration pins projecting therefrom, and said means for accurate positioning of said platen comprises a pair of spaced alignment holes in said second portion, each registrable with a corresponding one of said pair of registration pins projecting from said platen base.

13. A special effects compound according to claim 8, wherein said compound table includes first, second and third table portions and a base portion, said base portion being adapted for fixed reception in photographic reproduction equipment, said means for adjustably positioning said compound table including first micrometer means for moving said first table portion relative to said second table portion, second micrometer means for moving said first and second table portions relative to said third table portion and means for permitting said first, second and third table portions to rotate as a unit relative to said base portion.

14. A special effects compound according to claim 13, wherein a shoulder surrounds said light transmission opening in said compound table defining a recess for reception of said platen base.

15. A special effects compound according to claim 14, wherein said means for accurately positioning said platen base on said compound table includes said recess, a pair of register pins projecting from said shoulder and mating corresponding register holes in said platen base.

16. A special effects compound according to claim 13, wherein a pantograph plate projects from said third table portion, a pantograph arm projects from said first table portion to overlie said pantograph plate and a sight glass is positionable in said arm for viewing a grid positionable on said pantograph plate.

* * * * *